(12) United States Patent
Yoshizawa (10) Patent No.: US 8,659,567 B2
(45) Date of Patent: Feb. 25, 2014

(54) ELECTRONIC DEVICE HAVING HANDWRITTEN MATHEMATICAL FORMULA RECOGNITION FUNCTION

(75) Inventor: Hiroaki Yoshizawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 139 days.

(21) Appl. No.: 13/314,442

(22) Filed: Dec. 8, 2011

(65) Prior Publication Data

US 2012/0162107 A1 Jun. 28, 2012

(30) Foreign Application Priority Data

Dec. 22, 2010 (JP) ................................. 2010-285898

(51) Int. Cl.
*G06F 3/041* (2006.01)
(52) U.S. Cl.
USPC .................. 345/173; 178/18.01; 178/19.01; 382/186; 708/141; 715/808
(58) Field of Classification Search
USPC .................. 178/18.01–19.07; 345/173–179; 708/141; 382/186; 715/700–866
See application file for complete search history.

(56) References Cited

U.S. PATENT DOCUMENTS

| | | | | |
|---|---|---|---|---|
| 5,428,805 A | * | 6/1995 | Morgan | ................... 708/141 |
| 7,181,068 B2 | | 2/2007 | Suzuki et al. | |
| 2010/0231597 A1 | | 9/2010 | Yoshizawa | |

FOREIGN PATENT DOCUMENTS

| | | |
|---|---|---|
| JP | 2002-269499 A | 9/2002 |
| JP | 2004-145408 A | 5/2004 |
| JP | 2007-072718 A | 3/2007 |
| JP | 2010-211656 A | 9/2010 |
| JP | 2010-262535 A | 11/2010 |

OTHER PUBLICATIONS

Japanese Office Action dated Nov. 27, 2012 (and English translation thereof) in counterpart Japanese Application No. 2010-285898.

* cited by examiner

*Primary Examiner* — Michael Pervan
(74) *Attorney, Agent, or Firm* — Holtz, Holtz, Goodman & Chick, PC (57) ABSTRACT

An electronic device having a handwritten mathematical formula recognition function includes a display unit with a touch panel. When a recognition-assisting information input module inputs recognition-assisting information for handwritten data to be recognized in response to a user's operation, the handwritten data input on the touch panel is recognized by a handwritten mathematical formula recognition module as an element of a mathematical formula, based on the recognition-assisting information input from the recognition-assisting information input module. The mathematical formula recognized by the handwritten mathematical formula recognition module is displayed on the display unit in a text format by a mathematical formula output module.

18 Claims, 6 Drawing Sheets

26c INPUT IMAGE DATA

| HEADER | GUIDE DATA | d1 | d2 | d3 | d4 | ... | | | | |
|---|---|---|---|---|---|---|---|---|---|---|

FIG.4

26d MATHEMATICAL FORMULA DISPLAY DATA

| C1 | ∫ | C2 | 2 | C3 | 1 | C4 | X | C5 | 2 | C6 | d | C7 | X |
|---|---|---|---|---|---|---|---|---|---|---|---|---|---|

FIG.5A

$\int_{1}^{2} x2dx$

| ∫ | , | X | × | 2 | , | 2 | , | 1 | , | dx |
|---|---|---|---|---|---|---|---|---|---|---|

26e MATHEMATICAL FORMULA OPERATION DATA

FIG.5B

$\int_{1}^{2} x^2 dx$

| ∫ | , | X | ^ | 2 | , | 2 | , | 1 | , | dx |
|---|---|---|---|---|---|---|---|---|---|---|

ELECTRONIC DEVICE HAVING HANDWRITTEN MATHEMATICAL FORMULA RECOGNITION FUNCTION

CROSS-REFERENCE TO RELATED APPLICATIONS

This application is based upon and claims the benefit of priority from prior Japanese Patent Application. No. 2010-285898, filed Dec. 22, 2010, the entire contents of which are incorporated herein by reference.

BACKGROUND OF THE INVENTION

1. Field of the Invention

The present invention relates to an electronic device having a recognition function for a handwritten mathematical formula.

2. Description of the Related Art

Conventionally, a small-sized electronic calculator (a scientific electronic calculator) capable of functional computation such as the trigonometric function has been known in the art and in wide use. In recent years, a more advanced graph function calculator has been put to practical use. Compared with the conventional scientific calculator, the graph function calculator can process far more kinds of functions and is improved in performance, for example, in computation speed. In addition to these, the graph function calculator can display an arbitrary function formula as a graph, and has a computation function based on programming.

Since the graph function calculator is sophisticated, it is necessary to enter various kinds of numbers, characters and signs, and the graph function calculator must have a large number of keys. Furthermore, in order to input mathematical formulas for functional computation, various keys have to be operated in predetermined order in accordance with a function.

For example, when a mathematical formula for a definite integral is input, the elements of the mathematical formula for the integral have to be input by use of keys in the order of: the integral sign "$\int$"→the sign """ representing the upper-limit value of an integral interval→the upper-limit value "a"→the sign "_" representing the lower-limit value→the lower-limit value "b"→an integrand "f(x)".

As can be seen from this, it is a very heavy burden for a user to remember all key input orders determined for various kinds of functions. Under the circumstances, a handwritten mathematical formula recognition device, which performs character recognition for a mathematical formula handwritten on a touch panel by a user and inputs the recognized formula, is proposed in Jpn. Pat. Appln. KOKAI Publication No. 2007-072718, for example.

Since the handwritten mathematical formula recognition device has to perform collate and recognition processing for every handwritten input number and sign based on an enormous amount of recognition database, the time required for the recognition process is inevitably long. In addition, if the positional relationships between handwritten characters and signs differ from what they should be, the handwritten characters and signs may not be correctly recognized as part of the mathematical formula the user wants to enter.

BRIEF SUMMARY OF THE INVENTION

An embodiment of the present invention is intended to provide an electronic device having a handwritten mathematical formula recognition function that significantly improves the recognition rate of handwritten mathematical formulas.

An electronic device having a handwritten mathematical formula recognition function according to one embodiment of the present invention comprises:

a display unit comprising a touch panel;

a recognition-assisting information input module configured to input recognition-assisting information for handwritten data to be recognized, in response to a user's operation;

a handwritten mathematical formula recognition module configured to recognize data handwritten on the touch panel as an element of a mathematical formula, based on the recognition-assisting information input from the recognition-assisting information input module; and a mathematical formula output module configured to display a mathematical formula recognized by the handwritten mathematical formula recognition module on the display unit in a text format.

According to one embodiment of the present invention, it is possible to provide an electronic device having a handwritten mathematical formula recognition function that significantly improves the recognition rate of handwritten mathematical formulas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described, referring to the accompanying drawings.

Figure 1:
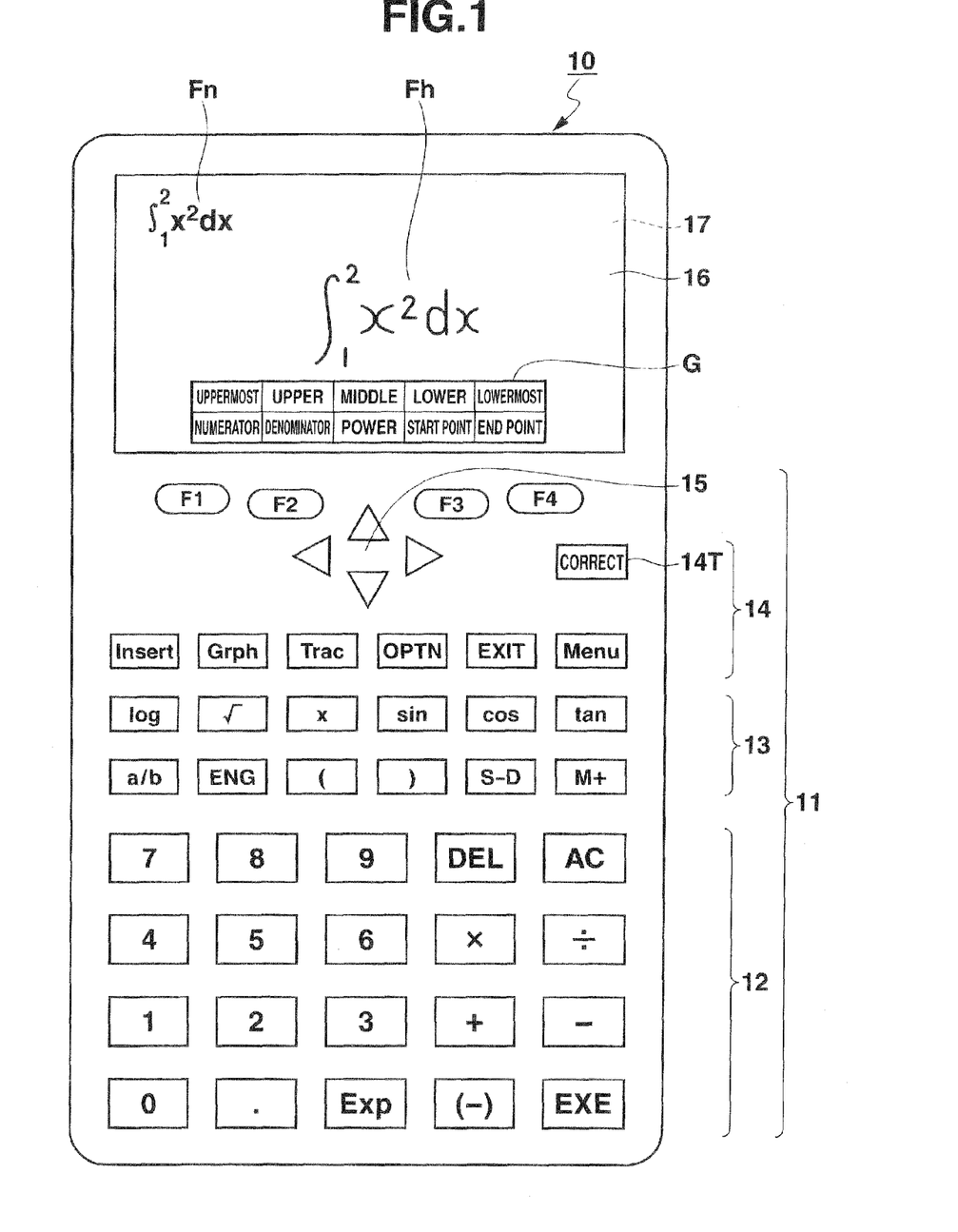
FIG. 1 is a front view showing the appearance of a graph function calculator 10, which is an embodiment of an electronic device haying a handwritten mathematical formula recognition function of the present invention.

FIG. 1 is a front view showing the appearance of a graph function calculator 10, which is an embodiment of an electronic device having a handwritten mathematical formula recognition function of the present invention.

The graph function calculator 10 has to be portable and is therefore small in size, so that a user can easily hold it with one hand and operate it. A key input unit 11 and a liquid crystal dot-matrix display unit 16 are provided on the front portion of the main body of the calculator 10.

A transparent-tablet touch panel 17 is laid over the display screen of the display unit 16, and the display unit 16 functions as a handwriting input portion.

The key input unit 11 comprises: a number/character/operation sign key group 12 used for inputting numbers, characters and various math signs and for designating execution of a computation; a function key group 13 for setting various mathematical functions and a memory function; a mode setting key group 14 used for setting various operation modes and displaying a menu window; a cursor key 15 used for moving a cursor displayed on the display unit 16 and for selecting a data item; and function keys [F1] to [F4] arranged along the lower edge of the display unit 16 and used for selectively designating various functions.

The number/character/operation sign key group 12 includes: [0]-[9] (number) keys; [+], [−], [×] and [÷] (math sign) keys; [DEL] (delete) key; [EXE] (execution) key; [AC] (clear) key; etc.

The function key group 13 comprises: [log] (logarithm) key; [√] (square root) key; and trigonometric function keys, such as [sin] key, [cos] key, and [tan] key, etc.

The mode setting key group 14 comprises: [Menu] key; [Insert] key; [Graph] key; [Trac] (trace) key; [Exit] key; [Correct] key 14T; etc.

The [Correct] key 14T is used when a mathematical formula handwritten by the user on the touch panel 17 is incorrectly recognized in the handwritten mathematical formula input mode, in order to correct the incorrectly-recognized portion of the mathematical formula.

The graph function calculator 10 is configured to display a recognition guide button G in the handwritten mathematical formula input mode. The recognition guide button G is used to designate the position and kind of each handwritten character in the mathematical formula as recognition-assisting information.

More specifically, the recognition guide button G displays [lowermost], [lower], [middle], [upper] and [uppermost] as position designation items, and displays [start point], [end point], [denominator], [numerator], and [power] as kind designation items.

The position designation buttons are operated to enter recognition-assisting information representing where a subsequently handwritten character should be in a mathematical formula. For example, the [lowermost] is operated when the start value of "Σ" is input, and [uppermost] is operated when the end value of "Σ" is input. The [upper] and [lower] are operated when the numerator and denominator of a fraction are input.

The kind designation buttons are operated to enter recognition-assisting information representing what element of a mathematical formula a subsequently handwritten character is. For example, the [start point] is operated when a start value of a definite integral is input, and the [end point] is operated when an end value of the definite integral is input. The recognition guide button G may be provided as a hardware button of the key input unit 11.

In the handwritten mathematical formula input mode, handwritten mathematical formula data Fh is displayed on the touch panel 17 of the display unit 16, and test mathematical formula data Fn obtained by the recognition of handwriting is displayed at the upper left corner of the screen.

Figure 2:
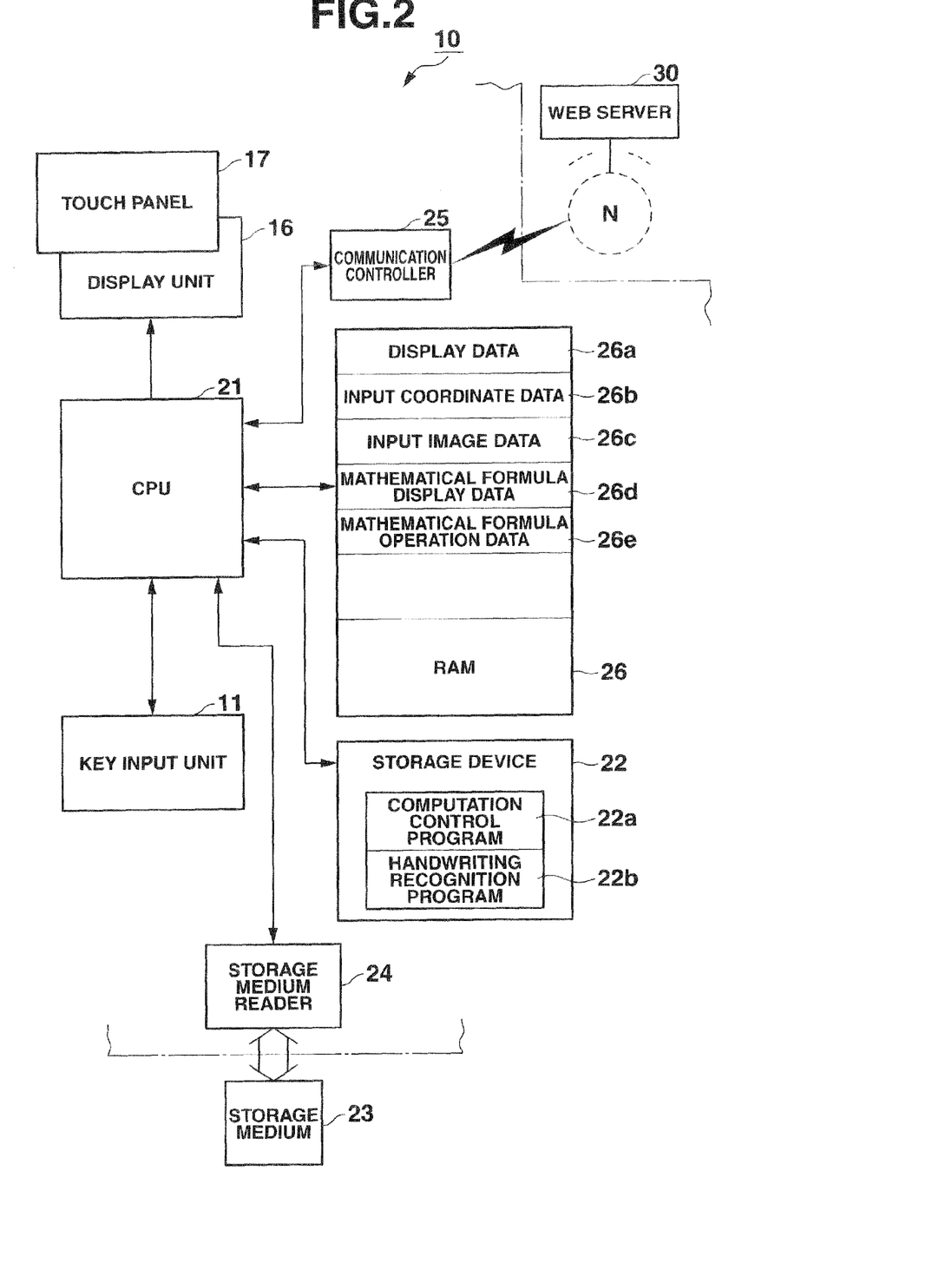
FIG. 2 is a block diagram illustrating the configuration of an electronic circuit of the graph function calculator 10.

FIG. 2 is a block diagram illustrating the configuration of an electronic circuit of the graph function calculator 10.

The graph function calculator 10 comprises a controller (CPU) 21, which is a computer.

The controller (CPU) 21 controls the portions of the circuit in accordance with a system program and a computation function control program stored in a storage device 22, using a RAM 26 as a working memory. The system program and the computation function control program are started in response to a key input signal entered from the key input unit 11.

The storage device 22 stores, for example, a handwriting recognition program 22b used for recognizing handwritten data (input image data 26c), which is input as handwriting using the touch panel 17, as numbers, characters and signs, and performs proper conversion. The computation control program 22a and the handwriting recognition program 22b may be written in the storage device 22 from an external storage medium 23 such as a memory card by means of a storage medium reader 24. Alternatively, they may be downloaded and written in the storage device 22 from a Web server (program server) 30 on a communication network N by means of a communication controller 25.

The storage device 22, the storage medium reader 24, the communication controller 25, the RAM. 26, and the key input unit 11 are connected to the controller (CPU) 21. In addition to these, the liquid crystal display (LCD) 16 and the touch panel 17 are connected.

A display data memory 26a, an input coordinate data memory 26b, an input image data memory 26c, a mathematical formula display data memory 26d, and a mathematical formula operation data memory 26e are secured in the RAM 26, in addition to a data memory used for storing data of various kinds loaded in the controller 21 for execution of computation operations.

The display data memory 26a stores bit-map-pattern data to be displayed on the display unit 16 and having a display screen size.

The input coordinate data memory 26b stores coordinate data corresponding to the present touch operation position on the touch panel 17.

Figure 3:
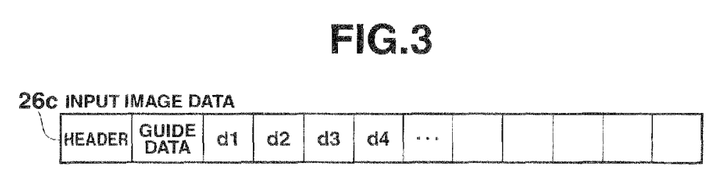
FIG. 3 illustrates the content of input image data stored in an input image data memory 26c of the graph function calculator 10.

FIG. 3 illustrates the content of the input image data stored in the input image data memory 26c of the graph function calculator 10.

The input image data memory 26c stores a header and subsequently stores coordinate data d1, d2, . . . , which are handwritten loci output from the touch panel 17 in accordance with user's handwriting. When the recognition guide button G is operated and the position and kind are designated, the recognition guide data of the corresponding position or kind is written immediately after the header.

Figure 4:
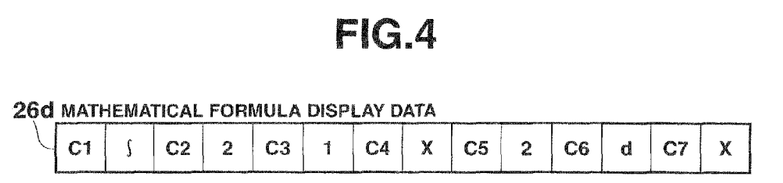
FIG. 4 illustrates the content of mathematical formula display data stored in a mathematical formula display data memory 26d of the graph function calculator 10.

FIG. 4 illustrates the content of mathematical formula display data stored in the mathematical formula display data memory 26d of the graph function calculator 10.

The mathematical formula display data memory 26d stores text data obtained by the recognition processing by the handwriting recognition program 22b and representing the elements of a mathematical formula. The text data is associated with a display control code Cn that designates where on the display screen the text data should be displayed and in what size.

Figure 5A:
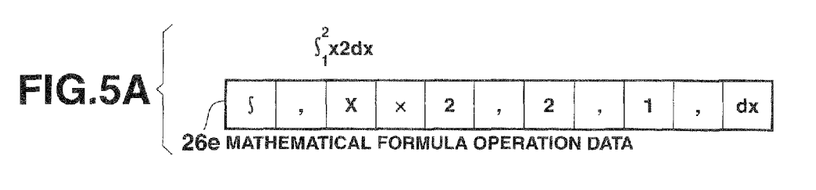
FIGS. 5A and 5B illustrate the content of mathematical formula operation data stored in a mathematical formula operation data memory 26e of the graph function calculator 10.
Figure 5B:
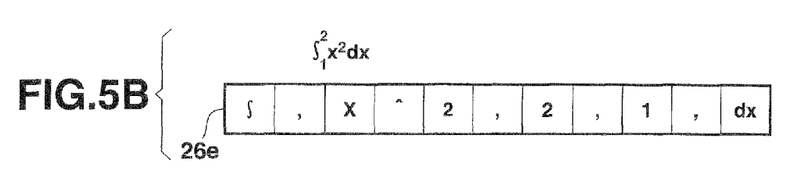

FIGS. 5A and 5B illustrate the content of mathematical formula operation data stored in the mathematical formula operation data memory 26e of the graph function calculator 10.

The mathematical formula operation data memory 26e stores data used for the operation processing of a mathematical formula obtained by the recognition processing by the handwriting recognition program 22b, the data being stored as an operation code.

When handwritten data is recognized by the handwriting recognition program 22b in the handwritten mathematical formula input mode, the graph function calculator 10 can designate the position on the mathematical formula and the character kind for each handwritten input character by means of the recognition guide button G.

A description will now be given of the handwritten mathematical formula recognition function of the graph function calculator 10.

Figure 6:
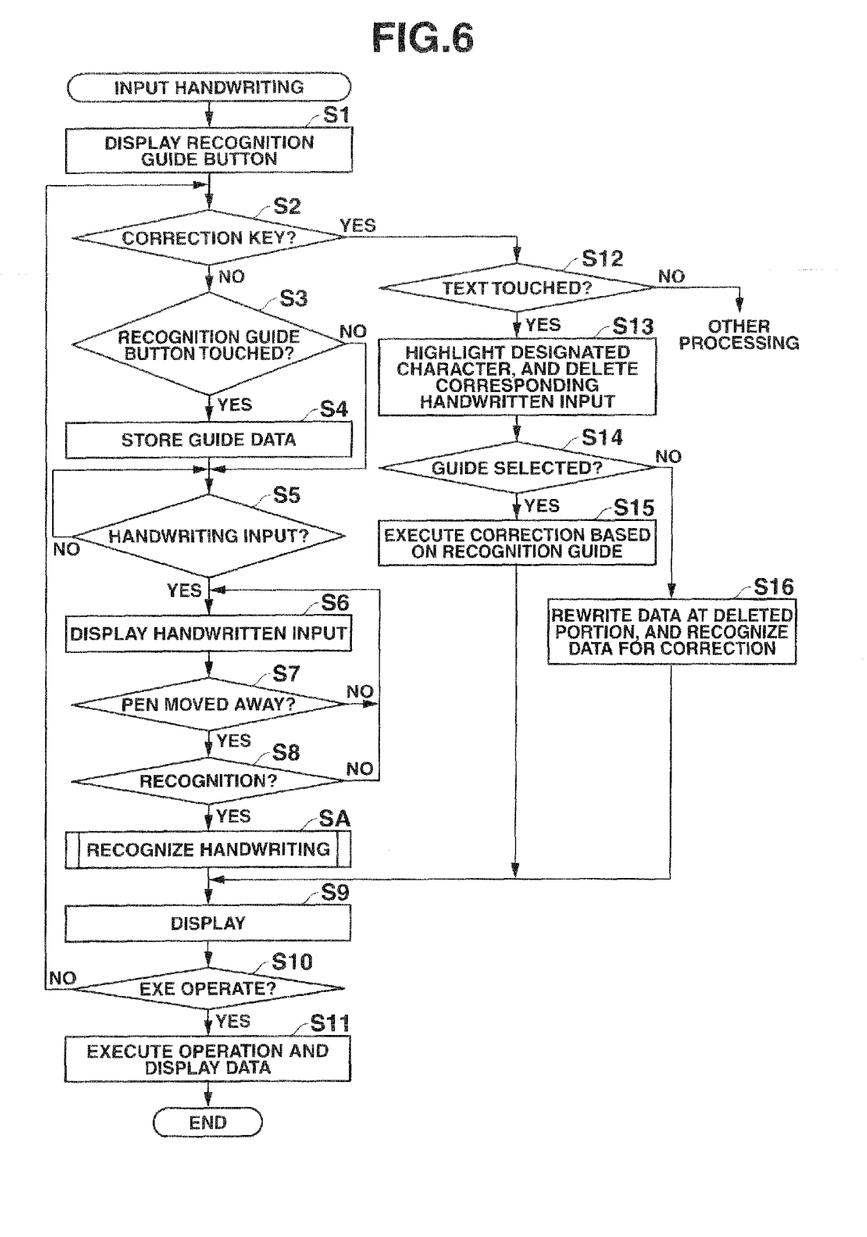
FIG. 6 is a flowchart illustrating the handwriting input processing performed by the graph function calculator 10.

FIG. 6 is a flowchart illustrating the handwriting input processing performed by the graph function calculator 10.

Figure 7:
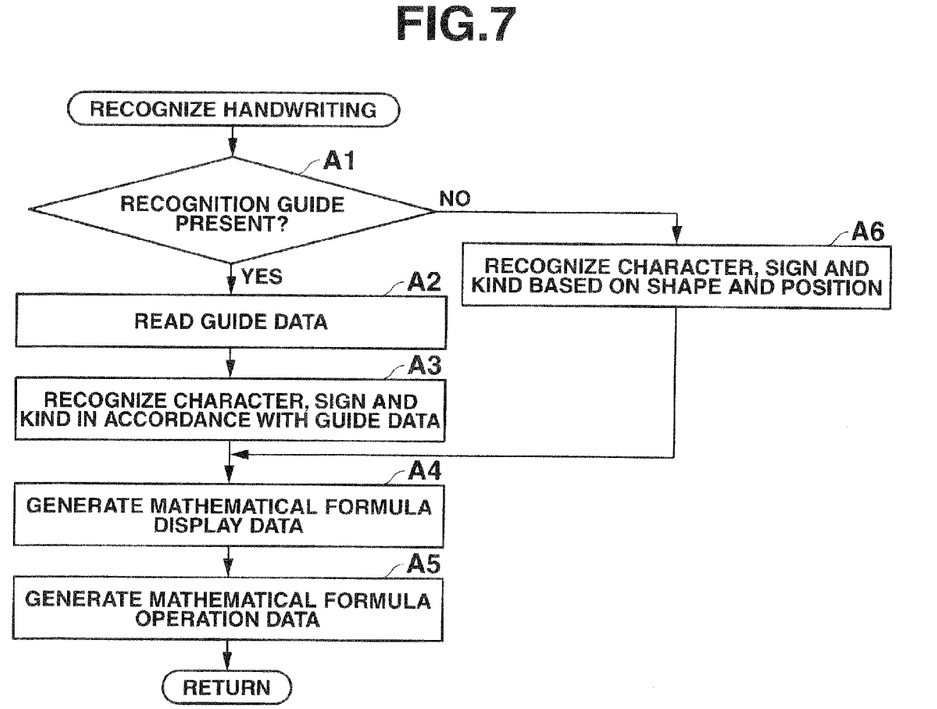
FIG. 7 is a flowchart illustrating the handwriting recognition processing included in the handwriting input processing performed by the graph function calculator 10.

FIG. 7 is a flowchart illustrating the handwriting recognition processing included in the handwriting input processing performed by the graph function calculator 10.

Figure 8:
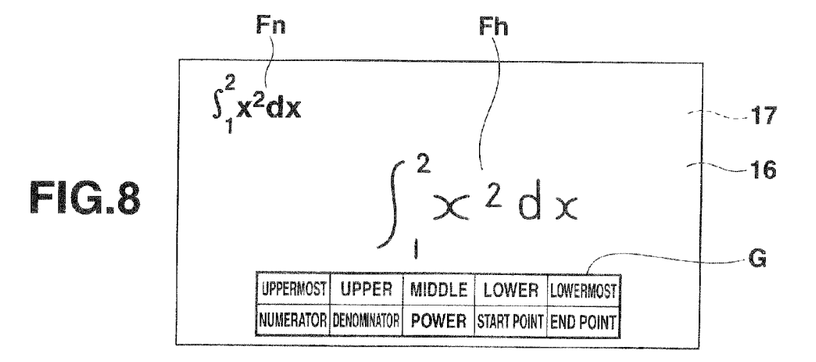
FIG. 8 illustrates the display operation (part 1) included in the handwriting input processing of the graph function calculator 10.

FIG. 8 illustrates the display operation (part 1) included in the handwriting input processing of the graph function calculator 10.

When an operation mode selection menu (not shown) appearing on the display unit 16 in response to the operation of the [MENU] key, and the graph function calculator 10 is set in the handwritten mathematical formula input mode, the recognition guide button G is displayed along the lower edge of the display screen (step S1), as shown in FIG. 8.

In the state shown in FIG. 8, the user can designate the position of an input character in a mathematical formula and the kind of that input character by operating the recognition guide button G, for each of the characters to be handwritten for input.

When the user touches one of the items of the recognition guide button (Yes in step S3), guide data is stored (step S4). When an element of the mathematical formula is handwritten (steps S5 to S8), the stored guide data is referred to in the handwriting recognition and then handwriting recognition is performed (step SA). When the recognition guide button G is not touched (No in step S3), the handwriting recognition processing is performed, without the guide button being referred to.

A description will be given with reference to FIG. 8 as to how a mathematical formula for a definite integral is input.

When the position designation item [middle] of the recognition guide button G is touched with a touch pen (not shown) before the integral sign "∫" is handwritten for input (Yes in step S3), recognition guide data [middle] is written in succession to the header of the input image data memory 26c of the RAM 26 (step S4).

When the integral sign "∫" is handwritten on the touch panel display unit 16 (17) (Yes in step S5), the coordinate data d1, d2, ... on the handwritten loci are sequentially written at positions subsequent to the recognition guide data [middle] of the input image data memory 26c. Based on the coordinate data the handwritten mathematical formula data Fh is displayed on the display unit 16 (step S6).

When the handwritten integral sign "∫" is written and it is determined that the touch pen is moved away from the touch panel 17 (Yes in step S7), a determination is made as to whether a predetermined time has passed without the next pen input being performed and if the process proceeds to the recognition processing of one character (step S8). For example, if one second has elapsed without the next pen input being performed (Yes in step S8), the process proceeds to the handwriting recognition processing (step SA). The handwriting recognition processing will be described in detail with reference to FIG. 7.

In the handwriting recognition processing, it is determined first of all whether or not recognition guide data is present in succession to the header of the input image data memory 26c (step A1).

If it is determined that the recognition guide data is present (Yes in step A1), the recognition guide data [middle] is read (step A2). The coordinate data d1, d2, ... on the handwritten loci are recognized as the integral sign "∫" of a mathematical formula on the basis of the recognition database, with the recognition guide data [middle] being referred to as the position (step A3).

As shown in FIG. 4, the text data "∫" representing the integral sign is associated with display control code C1 of the integral sign, and these are stored in the mathematical formula display data memory 26d. In this manner, the mathematical formula display data is generated (step A4).

As shown in FIG. 5B, the operation code of the integral sign "∫" is written in the mathematical formula operation data memory 26e. In this manner, mathematical formula operation data is generated (step A5).

If it is determined in step A1 that no recognition guide data is present (No in step A1), a character or sign of a mathematical formula and the kind of that character or sign are recognized based on the shape and position of the coordinate data d1, d2, ... of the handwritten loci (step A6).

When the display control code C1 of the integral sign and the text data "∫" are written in the mathematical formula display data memory 26d, the mathematical formula data Fn recognized as a text format is displayed on the display unit 16 (step S9).

Subsequently, when the kind designating button [start point] of the recognition guide button G is touched before the start value of the integral is handwritten for input (Yes in step S3), recognition guide data [start point] is written in succession to the header of the input image data memory 26c (step S4).

When the start value "1" of the integral is handwritten on the touch panel display unit 16 (17) in relation to the integral sign "∫" (Yes in step S5), the coordinate data d1, d2, ... of the handwritten loci are sequentially written in succession to the recognition guide data [start point], and are displayed as the handwritten mathematical formula data Fh on the display unit 16 (step S6).

Thereafter, when the start value "1" of the integral is handwritten, the handwriting recognition processing shown in FIG. 7 is executed on the basis of the recognition guide data [start point] written in the input image data memory 26c and the coordinate data d1, d2, ... of the handwritten loci (step SA).

When it is determined that recognition guide data is present (Yes in Step A1), the recognition guide data [start point] is read (step A2), and the coordinate data d1, d2, ... on the handwritten loci are recognized as the start value "1" of the mathematical formula on the basis of the recognition database, with the recognition guide data [start point] being referred to (step A3).

As shown in FIG. 4, text "1" is written in the mathematical formula display data memory 26d in association with the display control code 12 of the start value of the integral. In this manner, mathematical formula display data is generated (step A4).

As shown in FIG. 5B, the number code of the start value "1" of the integral is written in the mathematical formula operation data memory 26e. In this manner, mathematical formula operation data is generated (step A5).

Then, the recognized mathematical formula data Fn is displayed on the display unit 16 in accordance with the display control code 12 of the start value of the integral and the text "1" (step S9).

In the above explanation, the recognition guide data [start point] is described as being touched. When the recognition guide data [lower] is touched, it is determined in the handwriting recognition processing (step A3) that the start value of a definite integral is input to the lower portion of the mathematical formula subsequent to the integral sign. In other words, the same recognition result as that of the case where [start point] is touched is obtained.

Thereafter, kind recognition guide [end point] is designated in a similar manner to that described above, and end value [2] of the integral is handwritten for input. Position recognition guide [middle] is designated, and variable [x] of the integral is handwritten for input. Kind recognition guide [power] is designated, and the power value [2] of the variable [x] is handwritten for input. Position recognition guide [middle] is designate, and integral identifier [dx] is handwritten for input. Each time handwriting is input, handwriting recognition processing based on the character, sign and kind is performed in accordance with the designated recognition guide, and mathematical formula display data 26d and mathematical formula operation data 26e are generated. As shown in FIG. 8, handwritten mathematical formula data Fh is displayed, with recognized mathematical formula data Fn being displayed simultaneously (steps S2-S9).

Even when recognition guide [upper] is touched instead of recognition guide [power], the [upper] value following the variable x is regarded as power, and thus "x$^2$" is obtained in the handwriting recognition processing (step A3).

In this manner, the handwritten integral formula "∫(1~2) x$^2$dx" is displayed as handwritten mathematical formula data Fh and as recognized mathematical formula data Fn (the "1~2" in the integral formulas in the specification represents an integral range). When the [EXE] (execution) key is operated in the state where the two kinds of data are displayed (Yes in step S10), the operation processing based on the operation data is executed for the mathematical formula in the mathematical formula operation data memory 26e. The resultant data is displayed on the display unit 16 (step S11).

Figure 9:
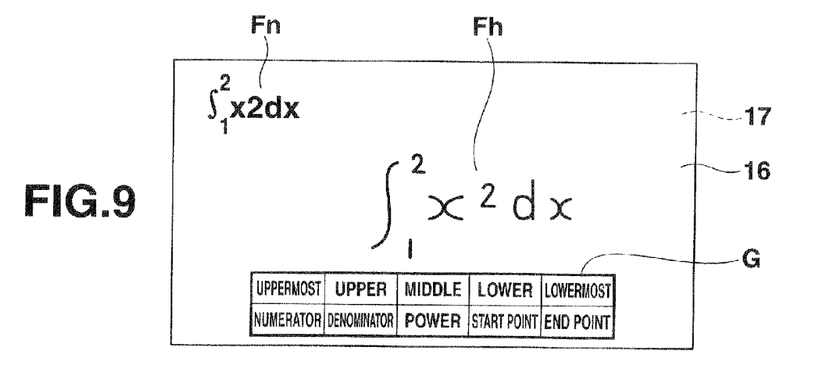
FIG. 9 illustrates the display operation (part 2) included in the handwriting input processing of the graph function calculator 10.

FIG. 9 illustrates the display operation (part 2) included in the handwriting input processing of the graph function calculator 10.

Figure 10:
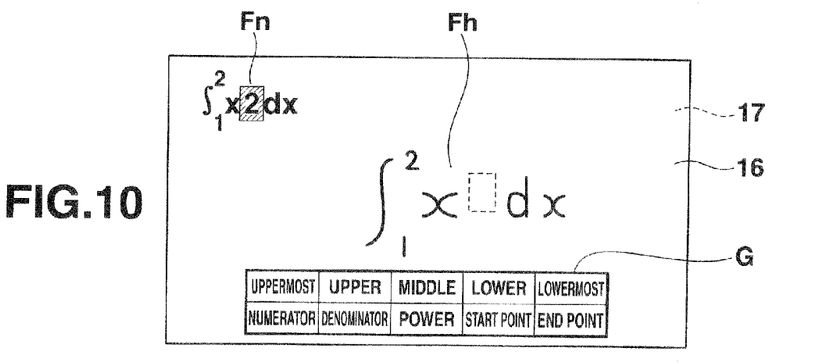
FIG. 10 illustrates the display operation (part 3) included in the handwriting input processing of the graph function calculator 10.

FIG. 10 illustrates the display operation (part 3) included in the handwriting input processing of the graph function calculator 10.

Let us assume that the integral formula [∫$^{(1~2)}$x$^2$dx], which the user inputs through the handwriting input processing (steps S1-S10) shown in FIGS. 6 and 7, is incorrectly recognized as [∫$^{(1~2)}$x2dx], due to failure to correctly use the recognition guide button G. The recognized result is unintended because the power value of "2" is recognized as a multiplier "2", as shown in FIGS. 5A and 9. In this case, the user operates the [Correct] key 14T. When it is determined that the [Correct] key 14T is operated (Yes in step S2), the correction mode is selected.

When the number "2" is touched and designated as correction target from the displayed text-format mathematical formula data Fn (Yes in Step S12), the designated text "2" in the recognized mathematical formula data Fn is highlighted, as shown in FIG. 10. In addition, the corresponding handwritten input is deleted from the handwritten mathematical formula data Fh (step S13).

When hind designation item. [power] of the recognition guide button G is touched and selected (Yes in step S14), "2" is recognized and corrected as a power value "2" in accordance with the selected recognition guide [power]. As a result, display control code C5 of the correction target text "2" of the mathematical formula display data stored in the mathematical formula display data memory 26d (FIG. 4) is corrected. In addition, the mathematical formula operation data stored in the mathematical formula operation data memory 26e is corrected in such a manner that the multiplier code "×" of the number "2" is replaced with the power code "$^\wedge$", as shown in FIG. 5B (step S15).

Even when [upper] is touched instead of kind designation button "power" of the recognition guide button G, the number at the upper position subsequent to the variant X is recognized as a power value. That is, "2" is recognized and corrected as a power value "2"

As a result, the correctly recognized mathematical formula data Fn, namely [∫(1~2)x$^2$dx], is displayed on the display unit 16 (step S9), as shown in FIG. 8.

In the state shown in FIG. 10, in which state the corresponding handwritten portion in the handwritten mathematical formula data Fh is deleted (Yes in step S12→step S13), the user can consciously write the power value "2" at the position of the deleted handwritten portion, without having to select a recognition guide based on the recognition guide button G (No in step S14). In accordance with the shape and position of the coordinate data d1, d2, . . . of the handwritten loci corresponding to the new input, a character, sign and kind of a mathematical formula are recognized again for correction. The display control code Cn of the mathematical formula display data stored in the mathematical formula display data memory 26d is corrected, and simultaneous with this, the mathematical formula operation data stored in the mathematical formula operation data memory 26e is corrected (step S16).

The handwritten mathematical formula recognition function of the graph function calculator 10 having the above configuration is featured in that handwritten characters and signs are recognized, with their input positions and sign kinds being designated by the recognition guide button G.

Therefore, even if the positional relationships between handwritten characters and signs differ from predetermined relationships, the handwritten characters and signs can be correctly recognized as part of the mathematical formula the user wants to enter.

The handwritten mathematical formula recognition function of the graph function calculator 10 having the above configuration is featured in that text requiring correction can be corrected, as desired, by designating the text in the correction mode and selecting a recognition guide item from the recognition guide button G.

Thanks to this feature, even when characters and signs constituting part of a handwritten mathematical formula are incorrectly recognized in terms of the positions in the mathematical formula and the kinds, the correction is easy and can be performed with high efficiency.

The technologies described in relation to the above embodiments, namely, the handwriting input processing illustrated in the flowchart of FIG. 6 and the handwriting recognition processing illustrated in the flowchart of FIG. 7, can be in form of programs executable by computers and stored in external recording mediums 23, such as memory cards (ROM cards, RAM cards, etc.), magnetic disks (floppy disks [registered trademarks], hard disks, etc.), optical disks (CD-ROM, DVD, etc.), and semiconductor memories.

A computer, which is an electronic device comprising the touch panel display unit 16 (17), reads the programs stored in the external recording mediums 23 by means of the storage medium reader 24, and the operation is controlled based on the read programs. In this manner, the mathematical formula recognition function for handwritten characters and signs enables designation of positions and kinds of elements of a mathematical formula, and processing similar to the above-mentioned technologies can be executed.

Data of programs that realize the above-mentioned technologies can be transmitted over a communication network N (such as the Internet). The program data can be read from a computer terminal 30 (such as a program server) connected to the communication network N (the Internet), and the mathematical formula recognition function for handwritten characters and signs enables designation of positions and kinds of elements of a mathematical formula.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device having a handwritten mathematical formula recognition function, the device comprising:
    a display unit comprising a touch panel;
    a recognition-assisting information input module configured to display, on the display unit, at least one operation item for designating a position in a mathematical formula for a handwritten character or sign to be recognized, and to input positional information in response to an operation of the operation item by a user;
    a handwritten mathematical formula recognition module configured to recognize a character or sign handwritten on the touch panel as a character or sign at a position in the mathematical formula that is indicated by the positional information input from the recognition-assisting information input module; and
    a mathematical formula output module configured to display the mathematical formula including the character or sign recognized by the handwritten mathematical formula recognition module on the display unit in a text format.

2. The electronic device according to claim 1, wherein:
    the recognition-assisting information input module comprises a kind information input module configured to display, on the display unit, at least one operation button representing a kind of element of the mathematical formula, and to input the kind of the element in response to an operation of the operation button by the user; and
    the handwritten mathematical formula recognition module is configured to recognize the character or sign input by handwriting as being a corresponding kind of element in the mathematical formula, based on the kind input by the kind information input module.

3. The electronic device according to claim 2, wherein the recognition-assisting information input module is configured to display a button for indicating that a character or sign input by handwriting is a power value.

4. The electronic device according to claim 1, further comprising:
    a correction mode setting module configured to set a correction mode in response to an operation by the user;
    a correction element display module configured to discriminatively display an element designated in response to an operation by the user from a mathematical formula displayed in text format by the mathematical formula output module on the display unit, in the correction mode set by the correction mode setting module;
    a mathematical formula correction module configured to re-recognize an element of the mathematical formula discriminatively displayed by the correction element display module, based on recognition-assisting information newly input by the recognition-assisting information input module; and
    a mathematical formula correction and display module configured to correct and display the element of the mathematical formula discriminatively displayed by the correction element display module, in accordance with the element of the mathematical formula re-recognized by the mathematical formula correction module.

5. The electronic device according to claim 4, further comprising:
    an erasing module configured to erase a handwritten data portion corresponding to the element designated in response to the operation by the user from the mathematical formula displayed in text format on the display unit, in the correction mode; and
    a handwriting correction module configured to re-recognize handwritten data rewritten at a position of an erased handwritten data portion.

6. The electronic device according to claim 1, wherein the recognition-assisting information input module is configured to display a button for designating one of an upper position and a lower position in the mathematical formula as the operation item.

7. A method for accepting input of a mathematical formula by an electronic device, the electronic device comprising a display unit having a touch panel, and the method comprising:
    displaying, on the display unit, at least one operation item for designating a position in a mathematical formula for a handwritten character or sign to be recognized;
    recognizing an input of positional information in response to an operation, by a user, of the operation item;
    recognizing a character or sign handwritten on the touch panel as a character or sign at a position in the mathematical formula that is indicated by the input positional information input; and
    displaying the mathematical formula including the character or sign obtained by handwriting recognition on the display unit in a text format.

8. The method according to claim 7, wherein displaying the at least one operation item comprises displaying, on the display unit, at least one operation button representing a kind of an element of the mathematical formula, and wherein the method further comprises:
    recognizing an input of the kind of the element in response to an operation of the operation button by the user; and
    recognizing the character or sign input by handwriting as being a corresponding kind of element in the mathematical formula, based on the input kind of the element, when the character or sign is recognized as an element of the mathematical formula.

9. The method according to claim 8, wherein displaying the at least one operation button comprises displaying a button for indicating that a character or sign input by handwriting is a power value.

10. The method according to claim 7, further comprising:
setting a correction mode in response to an operation by the user;
discriminatively displaying an element designated in response to an operation by the user from a mathematical formula displayed in text format on the display unit, in the correction mode;
re-recognizing the element of the mathematical formula discriminatively displayed, based on recognition-assisting information newly input from the displayed selection button; and
correcting and displaying the element of the mathematical formula discriminatively displayed, in accordance with the re-recognized element of the mathematical formula.

11. The method according to claim 10, further comprising:
erasing a handwritten data portion corresponding to the element designated in response to the operation by the user from the mathematical formula displayed in text format on the display unit, in the correction mode; and
re-recognizing handwritten data rewritten at a position of an erased handwritten data portion.

12. The method according to claim 7, wherein displaying the at least one operation item comprises displaying a button for designating one of an upper position and a lower position in the mathematical formula.

13. An electronic device comprising a display unit with a touch panel, a memory, and a processor, the processor being configured to execute functions comprising:
displaying, on the display unit, at least one operation item for designating a position in a mathematical formula for a handwritten character or sign to be recognized;
recognizing an input of positional information in response to an operation, by a user, of the operation item;
recognizing a character or sign handwritten on the touch panel as a character or sign at a position in the mathematical formula that is indicated by the input positional information; and
displaying the mathematical formula including the character or sign obtained by handwriting recognition on the display unit in a text format.

14. The electronic device according to claim 13, wherein displaying the at least one operation item comprises displaying, on the display unit, at least one operation button representing a kind of an element of the mathematical formula, and wherein the processor is configured to execute further functions comprising:
recognizing an input of the kind of the element in response to an operation of the operation button by the user; and
recognizing the character or sign input by handwriting as being a corresponding kind of element in the mathematical formula, based on the input kind of the element, when the character or sign input by handwriting is recognized as an element of the mathematical formula.

15. The electronic device according to claim 14, wherein displaying the at least one operation button comprises displaying a button for indicating that a character or sign input by handwriting is a power value.

16. The electronic device according to claim 13, wherein the processor is configured to execute further functions comprising:
setting a correction mode in response to an operation by a user;
discriminatively displaying an element designated in response to the operation by the user from a mathematical formula displayed in text format on the display unit, in the correction mode;
re-recognizing the element of the mathematical formula discriminatively displayed, based on recognition-assisting information newly input by the user; and
correcting and displaying the element of the mathematical formula discriminatively displayed, in accordance with the re-recognized element of the mathematical formula.

17. The electronic device according to claim 16, wherein the processor is configured to execute further functions comprising:
erasing a handwritten data portion corresponding to the element designated in response to the operation by the user from the mathematical formula displayed in text format on the display unit, in the correction mode; and
re-recognizing handwritten data rewritten at a position of an erased handwritten data portion.

18. The electronic device according to claim 13, wherein displaying the at least one operation item comprises displaying a button for designating one of an upper position and a lower position in the mathematical formula.

* * * * *